March 21, 1967  E. W. REISS  3,309,976
MEANS FOR OBTAINING A PHOTOGRAPHIC RECORD OF A ROBBERY
Filed Dec. 14, 1964
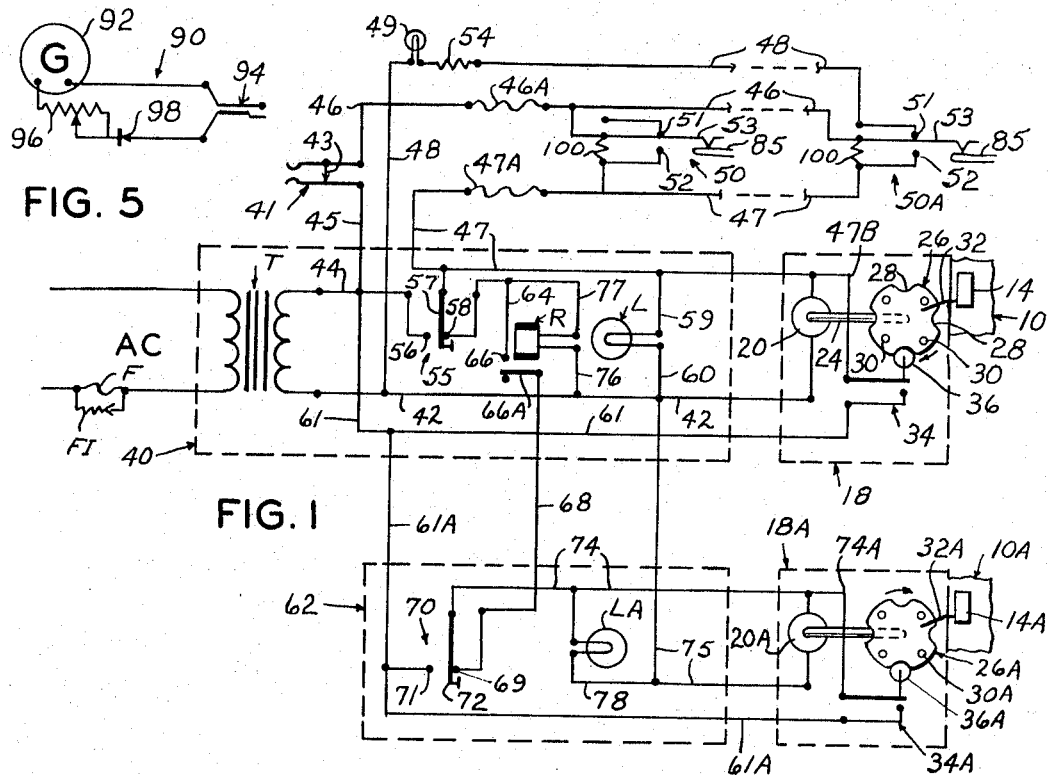
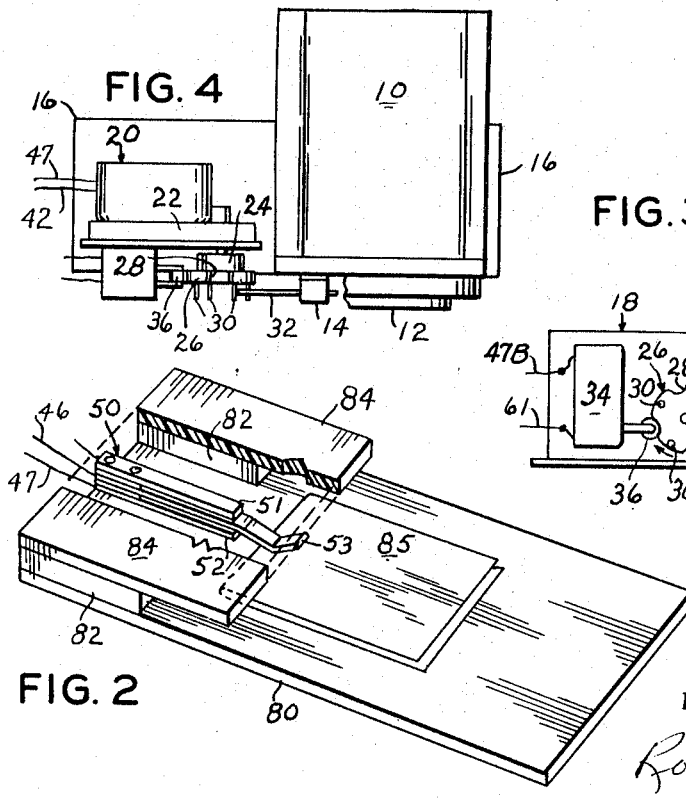
EARL W. REISS
INVENTOR.
BY
Robert K. Rhea
AGENT

United States Patent Office 3,309,976
MEANS FOR OBTAINING A PHOTOGRAPHIC
RECORD OF A ROBBERY
Earl W. Reiss, 16 Fairview Drive,
East St. Louis, Ill. 62203
Filed Dec. 14, 1964, Ser. No. 418,020
3 Claims. (Cl. 95—11)

The present invention relates to alarm systems and more particularly to a means for obtaining a photographic record of a person or persons in the act of a robbery or holdup.

Most robbery or holdup alarm systems in common use in banks, having and loan buildings, or the like, are actuated by a manually operated switch or button. This type of alarm system has the disadvantage occasioned by the robber's victim failing to sound the alarm due to threats of bodily harm made by the robber watching every move of his victim.

It is, therefore, the principal object of this invention to provide a means, including a camera, which will photograph the robbery suspect during the time the holdup is in progress.

Another object is to provide a sequence picture photographic record of a robber or holdup person in action wherein the camera actuating or starting means cannot be detected by the robber and will be actuated if he causes personnel to be locked in a safe and he empties the currency trays.

Another object is to provide means for exposing film in a camera by manual or automatic control wherein the camera is restored to a normal ready for operating position after exposing one or more frames of film.

Still another object is to provide a visual check means which indicates that the camera control circuit is ready to operate in the event of a robbery or holdup.

A further object is to provide a circuit control means connected with more than one camera which will operate the cameras simultaneously to photograph one or more robbery suspects in front of teller's windows, or the like.

Still another object is to provide a fail safe normally open camera actuating or till switch which may be placed within a teller's cage, in a money drawer, or the like, in a position easily accessible to the teller.

The present invention accomplishes these and other objects by a control circuit connecting a source of electrical energy to means associated with one or more sequence picture cameras through one or more camera actuating switches.

Other objects will be apparent from the following description when taken in conjunction with the accompanying single sheet of drawings, wherein:

FIGURE 1 is a wiring diagram connected with camera controls, the cameras and camera controls being illustrated diagrammatically;

FIGURE 2 is a perspective view of a till contact or switch;

FIGURE 3 is a front elevational view of a sequence picture camera and its controlling mechanism;

FIGURE 4 is a top view of FIG. 3; and,

FIGURE 5 is a wiring diagram of a circuit testing means.

Like characters of reference designate like parts in those figures of the drawings in which they occur.

In the drawings:

Referring more particularly to FIGS. 2 and 3, the reference numeral 10 indicates a sequence picture camera, as a whole. The camera 10 is conventional having a lens 12 and a trip-switch or starting button 14 for operating a battery powered circuit and mechanism for advancing 35 mm. film within the camera, neither of which is shown. The camera starting switch or button 14 is normally maintained "open" in its solid line position by a spring, not shown, and must be moved to its dotted line position (FIG. 3) to energize the camera circuit. The camera 10 is mounted on a suitable base 16 so that the camera lens 12 covers a selected area.

A camera starting control means 18 is mounted on the base 16 adjacent the camera. The camera control means 18 comprises a synchronous motor 20 having a reduction gear train 22 which drives a shaft 24. A disk-like cam 26 is coaxially connected to the shaft 24. The cam 26 is characterized by two diametrically opposite pairs of recesses or indentations 28 formed in its periphery. A plurality, four in the example shown, of outstanding pins 30 are connected at one end to the surface of the cam opposite its connection with the shaft 24 and are equally spaced between the respective recesses 28. A trip-finger or rod 32 is secured at one end to the camera trip button 14 and projects angularly downward, as seen in FIG. 3, toward the central portion of the cam 26.

As shown in FIGS. 1 and 3, the free end of the trip-finger 32 lies in the path of rotation of the pins 30 when the cam 26 is rotated in the direction of the arrow by the motor 20 for the purposes to be presently explained.

A microswitch 34, forming a part of the control means 18, is provided with a roller 36 which is cooperatively received by the respective recess 28 to open the contacts of the microswitch and close the microswitch by rolling contact with the cam periphery when the roller 36 is positioned between the recesses 28 in the manner more fully explained hereinbelow.

Referring more particularly to FIG. 1, a power supply and operating circuit for the camera 10 and camera control means 18 is indicated at 40 within the dotted shield lines. A source of alternating current AC is connected with the primary winding of a transformer T in series with a fuse F and open fuse indicator F1. One terminal of the secondary winding of the transformer T is connected by a wire 42 to one terminal of the motor 20. The other terminal of the secondary winding of the transformer T is connected to the other terminal of the motor 20 by wires 44, 45, 46, 46A, 47A and 47 through a jack 41, having normally closed contacts 43 and through a plurality of till switches, connected in parallel, as indicated at 50 and 50A. The wire 47 is also connected to one terminal of the microswitch 34 by a wire 47B. The other terminal of the microswitch 34 is connected to the wire 44 by a wire 61.

The till switches 50 and 50A each include a pair of spaced-apart terminals 51 and 52 and a central spring contact 53, projecting outwardly of the terminals 51 and 52 and which is normally maintained in contact with the terminal 51 in the manner more fully explained hereinbelow. The terminal 51 of the till switch 50A is connected, by a wire 48, to the wire 42 in series with an indicator lamp 49 and resistor 54. The purpose of the lamp 49 is to provide visual indication that contact is made between the spring contact 53 and terminal 51 of the switch 50A in series with wires 46A, 46, normally closed contacts of the jack 41, and wires 45 and 44 to the transformer T. The wires 46A and 47A, indicated by the irregular lines, are coiled retractile cords permitting repeated movement of the till switches for the purposes which will presently be apparent. A resistor 100 bridges the contacts 52 and 53. The value of the resistors 100 is such that only a small amount of current will be allowed to pass so that the motor 20 and other components, to be presently described, will not be energized.

A push button switch 55 has one of its terminals 56 connected with the wire 44. The switch arm 57 of the push button switch 55 is connected with the wire 47 and is normally in contact with the other terminal 58 of the switch.

An indicator or silent alarm lamp L is connected by wires 59 and 60, respectively, to the wires 42 and 47.

One or more additional cameras, as desired, may be connected to the operating circuit 40, as is indicated at 10A and by the button 14A which is connected with a similar camera control means 18A actuated by an operating circuit within the dotted shield lines 62. The camera control means 18A is identical with respect to the control means 18, containing a motor 20A connected with a cam 26A in contact with a microswitch 34A and a camera trip-finger 32A. A wire 61A, connected with the wire 61, is connected to one terminal of the microswitch 34A. The coil of a six second time delay relay R is connected to the wire 42 and the terminal 58 of the push button switch 55 by wires 76 and 77, respectively. A wire 64, connected with the wire 77, is connected to one terminal 66 of the relay R. The armature 66A, of the relay R, is connected by a wire 68, to one terminal 69 of a similar push button switch 70. The purpose of the time delay relay R is to prevent operation of the second camera 10A or other cameras when the camera 10 is manually operated as more fully explained hereinbelow. A second terminal 71, of the push button switch 70, is connected to the wire 61A. A switch arm 72, of the push button switch 70, is normally in contact with the terminal 69 of the switch 70. A wire 74 connects the push button arm 72 to one terminal of the motor 20A. The wire 74 is similarly connected to the other terminal of the microswitch 34A by a wire 74A. The other terminal of the motor 20A is connected by a wire 75 to the wire 42. Similarly a silent alarm indicator lamp LA has one of its terminals connected to the wire 74 and its other terminal connected to the wire 75 by a wire 78.

Referring more particularly to FIG. 2, the till switch 50 is preferably mounted on a base 80 between parallel supports 82 and is covered by a top plate 84, formed of opaque material, bridging the supports 82. The base 80 is preferably mounted in a teller's currency tray, or the like, not shown, so that the till switch will be hidden from the view of unauthorized persons. The spring contact 53 tends to make contact with the terminal 52 but is, as stated hereinabove, normally held in contact with the terminal 51 by a piece of currency, such as a bill 85, folded once and interposed between the spring contact 53 and the adjacent surface of the base 80. As many additional till switches, such as is indicated at 50A (FIG. 1), are connected in parallel to the till switch 50 and located in the respective teller's currency trays, as may be necessary.

*Operation*

In operation the cameras, camera control means and operating circuits are connected as described hereinabove. In the event of a robbery, the teller being robbed simply removes the bill 85 from the till switch 50 while handing money to the robber. Removal of the bill 85 allows the spring contact 53 to make with the terminal 52 and complete a circuit from the transformer T to the motor 20 over wires 42, 44, 45, 46, 46A, 47 and 47A, which starts revolving the cam 26 in the direction of the arrow. The pins 30, by contacting and moving the trip-finger 32, as shown by dotted lines (FIG. 3) starts the camera 10. The camera 10 continues to run until all of its film is exposed unless the spring contact 53 is manually repositioned in contact with terminal 51 to interrupt the circuit. When camera 10 is energized by the closing of a till switch, as disclosed hereinabove, the other camera 10A is not energized for operation until the coil of the time delay relay R pulls its armature 66A into contact with its terminal 66 to complete a circuit to the motor 20A. When thus placed in operation the second camera 10A continues to run until all of its film is exposed unless its energizing circuit is interrupted by the opening by the till switch as explained hereinabove for camera 10.

*Circuit testing*

To insure that the cameras and other circuits are in readiness for operation, the push button switch 55 is manually operated to test the camera 10. This is accomplished by moving the switch lever 57, of the push button switch 55, to momentarily make with its terminal 56 to by-pass the till switch portion of the circuit. The filament of the lamp L will be excited if the circuit is complete while simultaneously energizing the motor 20 and the coil of relay R. Momentarily energizing the motor 20 starts revolving the cam 26. The microswitch roller 36 is moved out of a recess 28 and closes the contacts of the microswitch 34 completing a circuit from the transformer T to the motor 20 over wires 42, 44, 61 and 47B, during the time the roller is positioned on the periphery of the cam 26 between adjacent ones of the recesses 28 but after one quarter turn of the cam 26 the roller 36 enters the next recess 28 which opens the microswitch 34 and interrupts the current to the motor 20. The 90° rotation of the cam 26 causes the camera 10 to expose a single frame of film. The functional testing of the camera 10 by closing the push button switch 55, does not serve to start operation of the other camera control button 14A as a result of the time delay of relay R.

Camera 10A and its control circuits may be similarly tested for operation by the push button switch 70 by momentarily moving its arm 72 to terminal 71 which completes a circuit to one terminal of the motor 20A from the transformer T over wires 44, 61, 61A and 74 and from the wire 42 over wire 75 to the other terminal of the motor 20A, which similarly excites the filament of the lamp LA and exposes one frame of film.

Another purpose of the push button switches 55 and 70 is to provide a means of photographing a person while cashing or attempting to cash a check.

The wiring to the till switches 50 and 50A is subject to wear by daily use and may be tested for readiness of operation by a test means, indicated generally at 90, (FIG. 5) which comprises a galvanometer 92, connected to a plug 94, through a potentiometer 96 and rectifier 98. The filament of lamp 49 normally remains excited by the contact of the spring contact 53 with the terminal 51 of the till switch 50A. The filament of lamp L will be excited if the currency 85 is not in place to break contact between the spring contact 53 and terminal 52 of any till switch. The known value of the resistors 100, connected in parallel in the above disclosed till circuit wiring 48 may thus be checked by inserting the plug 94 into the jack 41. In the event that any of the wiring to the till switch contacts is not making proper continuity with the resistors 100, or if a wire or a retractile cord is broken, the value shown by the galvanometer 92 visually indicates that the circuit requires attention.

Obviously the invention is susceptible to some change or alteration without defeating its practicability, and I therefore do not wish to be confined to the preferred embodiment shown in the drawings and described herein, further than I am limited by the scope of the appended claims.

I claim:

1. In a robbery recording system the combination with a self operated sequence camera having a starting button, of: means mounted adjacent the camera for moving the starting button to camera operating position in response to an alarm signal, including, a motor, a gear train driven by said motor, a shaft driven by said gear train, a disk-like cam coaxially connected with said shaft, circumferentially spaced-apart pins connected to one face of said cam and projecting outwardly of said cam parallel with the longitudinal axis of said shaft, a trip-finger secured to said starting button and having an end portion disposed in the path of travel of said pins; a transformer, said transformer having its primary side connected with a source of electrical energy; alarm signal means including a tilt switch having a pair of spaced apart terminals and having a spring contact interposed between said pair of terminals; and wiring connecting the secondary side of said transformer to said motor through said alarm signal means.

2. Structure as specified in claim 1 and a push button switch interposed in the circuit to said motor for manually energizing the latter and starting said camera.

3. Structure as specified in claim 2 in which a microswitch is positioned adjacent said cam, other wiring connecting one terminal of the secondary side of said transformer to one terminal of said motor through said microswitch, said microswitch having a roller contacting the periphery of said cam for opening and closing the circuit to said motor at selected intervals.

References Cited by the Examiner

UNITED STATES PATENTS

| 1,818,162 | 8/1931 | Robbins | 95—11.5 |
| 1,978,500 | 10/1934 | Meyer | 95—11.5 |
| 2,139,703 | 12/1938 | Taylor | 95—11.5 |
| 3,120,160 | 2/1964 | Hammer | 95—15 |

JOHN M. HORAN, *Primary Examiner.*